(12) United States Patent
Xu

(10) Patent No.: US 11,888,395 B2
(45) Date of Patent: Jan. 30, 2024

(54) SWITCH MODE POWER SUPPLY WITH IMPROVED TRANSIENT PERFORMANCE AND CONTROL CIRCUIT THEREOF

(71) Applicant: Chengdu Monolithic Power Systems Co., Ltd., Chengdu (CN)

(72) Inventor: Shanglin Xu, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 98 days.

(21) Appl. No.: 17/704,642

(22) Filed: Mar. 25, 2022

(65) Prior Publication Data

US 2022/0329154 A1 Oct. 13, 2022

(30) Foreign Application Priority Data

Apr. 12, 2021 (CN) .......................... 202110392204.4

(51) Int. Cl.
*H02M 3/156* (2006.01)
*H02M 1/00* (2006.01)

(52) U.S. Cl.
CPC ......... *H02M 3/156* (2013.01); *H02M 1/0009* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225;
(Continued)

(56) References Cited

U.S. PATENT DOCUMENTS 6,577,180 B2 * 6/2003 Liu ........................... G05F 1/10
327/344
7,880,446 B2 * 2/2011 Chen ..................... H02M 3/156
320/166
(Continued)

*Primary Examiner* — Jeffrey A Gblende
(74) *Attorney, Agent, or Firm* — Perkins Coie LLP

(57) ABSTRACT

A control circuit used in a switch mode power supply is provided. The control circuit has an error amplifier, a first compensation network having a first resistance and a second compensation network having a second resistance. The error amplifier has a first input terminal, a second input terminal and an output terminal. The first compensation network is coupled between the first input terminal and the output terminal of the error amplifier. The second compensation network is coupled to the first input terminal of the error amplifier. When the switch mode power supply enters the transient state, the control circuit increases the first resistance of the first compensation network or decreases the second resistance of the second compensation network.

17 Claims, 9 Drawing Sheets

(58) Field of Classification Search
CPC .. H02M 7/217; H02M 1/0025; H02M 1/0045; H05B 39/048; B23K 11/24; H04B 2215/069
See application file for complete search history.

(56) References Cited

U.S. PATENT DOCUMENTS

| | | | | |
|---|---|---|---|---|
| 7,982,447 | B2 * | 7/2011 | Chellamuthu | H02M 3/156 323/285 |
| 9,252,659 | B2 * | 2/2016 | Oki | H02M 3/156 |
| 9,459,642 | B2 * | 10/2016 | Chen | G05F 1/575 |
| 9,837,899 | B2 | 12/2017 | Li | |
| 10,116,206 | B2 * | 10/2018 | Zhang | H02M 1/08 |
| 10,727,742 | B2 | 7/2020 | Chen et al. | |

* cited by examiner

SWITCH MODE POWER SUPPLY WITH IMPROVED TRANSIENT PERFORMANCE AND CONTROL CIRCUIT THEREOF

CROSS-REFERENCE TO RELATED APPLICATIONS

This application claims the benefit of CN application No. 202110392204.4, filed on Apr. 12, 2021, and incorporated herein by reference.

TECHNICAL FIELD

The present invention relates generally to electronic circuits, and more particularly but not exclusively, to switch mode power supplies and associated control circuits.

BACKGROUND

In a switch mode power supply, sometimes it is necessary to design a narrow control loop bandwidth based on practical applications. For example, when testing a charging integrated circuit (IC) on bench, a battery simulator rather than a real battery is usually used. The battery simulator is coupled to a battery pin of the charging IC through a long cable, which will produce a large parasitic inductance at the battery pin. The parasitic inductance is coupled to an output pin of the charging IC through an internal circuit of charging IC, and will resonant with an output capacitor at the output pin, and thus causing a poor control loop stability of the charging IC. In these occasions, a narrow control loop bandwidth is used to solve or alleviate the problem of poor control loop stability. However, the narrow control loop bandwidth will result in a poor transient performance. Therefore, it is desired to provide a switch mode power supply, which can improve the transient performance.

SUMMARY

An embodiment of the present invention discloses a control circuit used in a switch mode power supply, wherein the switch mode power supply has a power switch and an inductor, and converts an input voltage into an output voltage, the control circuit comprising: a transient detector, an error amplifier, a first compensation network and a first resistance regulator. The transient detector is configured to detect whether the switch mode power supply is in a transient state, and generate a transient detecting signal based on the detection result. The error amplifier has a first input terminal, a second input terminal and an output terminal, wherein the first input terminal is configured to receive a first feedback voltage indicative of the output voltage and the second input terminal is configured to receive a first reference voltage, the error amplifier is configured to provide an error signal at the output terminal based on the first feedback voltage and the first reference voltage. The first compensation network has a first resistance, and has a first terminal and a second terminal, wherein the first terminal is coupled to the first input terminal of the error amplifier and the second terminal is coupled to the output terminal of the error amplifier. The first resistance regulator is configured to receive the transient detecting signal and regulate the first resistance based on the transient detecting signal.

An embodiment of the present invention discloses a switch mode power supply configured to convert an input voltage into an output voltage, the switch mode power supply comprising: a power switch, an inductor, a transient detector, an error amplifier, a first compensation network and a first resistance regulator. The transient detector is configured to detect whether the switch mode power supply is in a transient state, and generate a transient detecting signal based on the detection result. The error amplifier has a first input terminal, a second input terminal and an output terminal, wherein the first input terminal is configured to receive a first feedback voltage indicative of the output voltage and the second input terminal is configured to receive a first reference voltage, the error amplifier is configured to provide an error signal at the output terminal based on the first feedback voltage and the first reference voltage. The first compensation network has a first resistance, and has a first terminal and a second terminal, wherein the first terminal is coupled to the first input terminal of the error amplifier and the second terminal is coupled to the output terminal of the error amplifier. The first resistance regulator is configured to receive the transient detecting signal and regulate the first resistance based on the transient detecting signal.

An embodiment of the present invention discloses a control method used in a switch mode power supply, wherein the switch mode power supply has a power switch and converts an input voltage into an output voltage by controlling the power switch, the control method comprising: 1) engaging a control loop having an error amplifier to control the power switch, wherein the error amplifier has a first input terminal, a second input terminal and an output terminal; 2) coupling a first compensation network between the first input terminal and the output terminal of the error amplifier, or coupling a second compensation network to the first input terminal of the error amplifier; and 3) detecting whether the switch mode power supply enters a transient state, if the switch mode power supply enters the transient state, increasing a first resistance of the first compensation network or decreasing a second resistance of the second compensation network.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
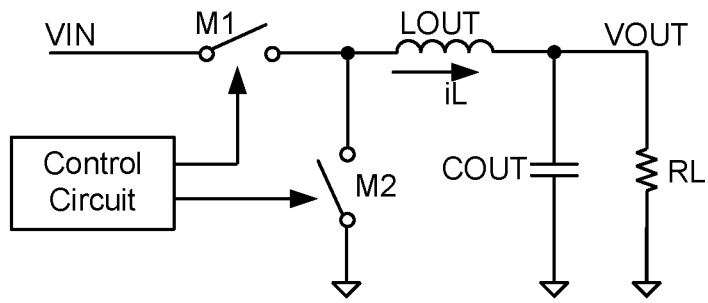
FIG. 1 is a switch mode power supply 100 in accordance with an embodiment of the present invention.

FIG. 1 is a switch mode power supply 100 in accordance with an embodiment of the present invention. The switch mode power supply 100 comprises a switching circuit and a control circuit. The switching circuit has a high side switch M1, a low side switch M2, an inductor LOUT and an output capacitor COUT. The switching circuit converts an input voltage VIN into an output voltage VOUT to supply a load RL via turning ON and OFF of the high side switch M1 and the low side switch M2. In one embodiment, the high side switch M1 and the low side switch M2 can be configured in MOSFETs. In other embodiments, the high side switch M1 and the low side switch M2 can be other controllable semiconductor device, such as IGBT and so on. In yet another embodiment, the low side switch M2 can be replaced by a diode. In the example shown in FIG. 1, the switch mode power supply 100 is configured in Buck topology. In detail, the high side switch M1 and the low side switch M2 are coupled in series between the input voltage VIN and a reference ground, the common connect node of the high side switch M1 and the low side switch M2 is coupled to a first terminal of the inductor LOUT. A second terminal of the inductor LOUT is coupled to a first terminal of the output capacitor COUT, and a second terminal of the output capacitor COUT is coupled to the reference ground. Wherein the common connect node of the inductor LOUT and the output capacitor COUT is configured to provide the output voltage VOUT, an inductor current iL flows through the inductor LOUT. Those skilled in the art can understand that, the switch mode power supply 100 can be configured in other suitable topologies, such as Boost, Buck-Boost and so on.

In one embodiment, the switch mode power supply 100 is used in battery charging applications, on one hand, the output voltage VOUT is used as a system output voltage for supplying power to the load RL, on the other hand, the output voltage VOUT can be used to charge a battery (not shown).

Figure 2:
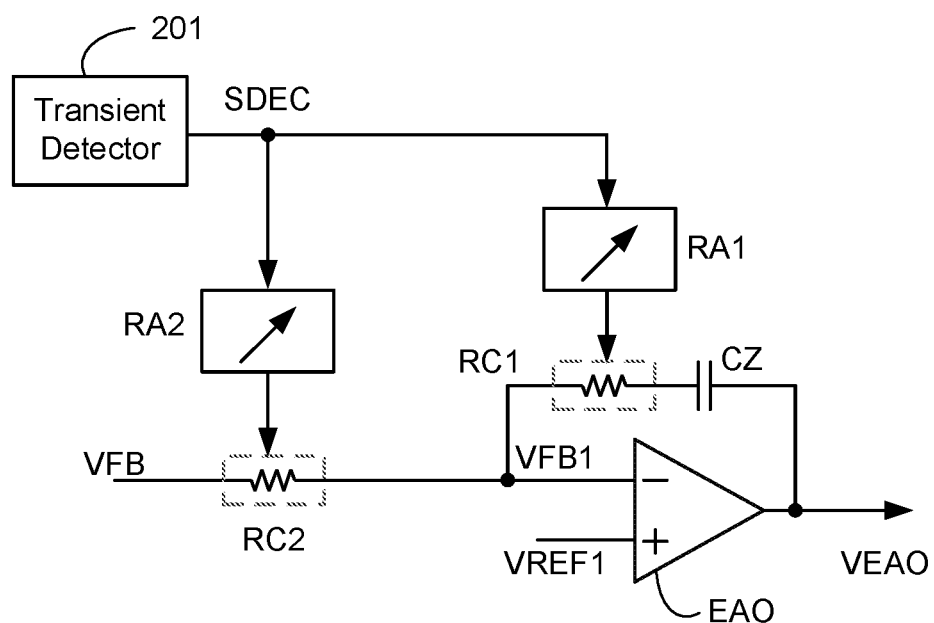
FIG. 2 is a control circuit 200 used in the switch mode power supply 100 in accordance with an embodiment of the present invention.

FIG. 2 is a control circuit 200 used in the switch mode power supply 100 in accordance with an embodiment of the present invention. The control circuit 200 comprises an error amplifier EAO, a transient detector 201 and a first compensation network RC1. The error amplifier EAO has a first input terminal, a second input terminal and an output terminal, wherein the first input terminal is configured to receive a first feedback voltage VFB1 indicative of the output voltage VOUT, and the second input terminal is configured to receive a first reference voltage VREF1. The error amplifier EAO is configured to provide an error signal VEAO at the output terminal based on the difference between the first reference voltage VFER1 and the first feedback voltage VFB1. In one embodiment, the first input terminal is an inverting input terminal, and the second input terminal is a non-inverting input terminal.

The transient detector 201 is configured to detect whether the switch mode power supply 100 is in a transient state, and generate a transient detecting signal SEDC based on the detection result. In detail, when the switch mode power supply 100 is in the transient state, the transient detecting signal SEDC is in logic valid (e.g., logic "1"), when the switch mode power supply 100 is not in the transient state, for example, the switch mode power supply 100 is in a steady state, the transient detecting signal SEDC is in logic invalid (e.g., logic "0"). In one embodiment, when the output voltage VOUT changes and is no longer a stable value, the switch mode power supply 100 is considered to enter the transient state from the steady state. At this time, the transient detecting signal SEDC changes from logic invalid into logic valid. After a period of time, the output voltage VOUT is regulated to be the stable value, the switch mode power supply 100 is considered to enter the steady state from the transient state, and the transient detecting signal SEDC changes from logic valid into logic invalid. In a further embodiment, when the output voltage VOUT decreases to a first threshold from the stable value, the switch mode power supply 100 is considered to enter the transient state. After a period of time, the output voltage VOUT is regulated to the stable, the switch mode power supply 100 is considered to enter the steady state from the transient state. Similarly, in yet another embodiment, when the output voltage VOUT increases to a second threshold from the stable value, the switch mode power supply 100 is considered to enter the transient state. After a period of time, the output voltage VOUT is regulated to the stable value, the switch mode power supply 100 is considered to enter the steady state from the transient state. In one embodiment, when the load RL or the input voltage VIN changes suddenly, the switch mode power supply 100 is considered to enter the transient state and will be in the transient state for a period of time. In another embodiment, the transient state refers to a process that the switch mode power supply 100 regulates the output voltage VOUT and restores it to the stable value by using a control loop.

Further referring to FIG. 2, in one embodiment, the first compensation network RC1 has a first resistance, and has a first terminal and a second terminal, wherein the first terminal is coupled to the first input terminal of the error amplifier EAO, and the second terminal is coupled to the output terminal of the error amplifier EAO.

In one embodiment, the control circuit 200 further comprises selectively a second compensation network RC2. The second compensation network RC2 has a second resistance, and has a first terminal and a second terminal, wherein the first terminal is coupled to the first input terminal of the error amplifier EAO, and the second terminal is configured to receive a feedback voltage VFB indicative of the output voltage VOUT. Those skilled in the art can understand that, "comprises selectively" refers that the control circuit 200 may or may not comprise the second compensation network RC2.

In one embodiment, the control circuit 200 does not comprise the second compensation network RC2, but comprises a first resistance regulator RA1. The first resistance regulator RA1 is coupled to the transient detector 201 to receive the transient detecting signal SDEC and is configured to regulate the first resistance of the first compensation network RC1 based on the transient detecting signal SDEC. In detail, when the transient detecting signal SDEC is in logic valid, the first resistance regulator RA1 increases the first resistance. When the transient detecting signal SDEC is in logic invalid, the first resistance regulator RA1 decreases the first resistance.

In the control circuit 200, when the switch mode power supply 100 is in the transient state, the error signal VEAO is a sum of the first feedback voltage VFB1 and a first voltage across the first compensation network RC1, wherein the first voltage across the first compensation network RC1 is a product of the first resistance and a first transient current flowing through the first compensation network. In one embodiment, when the output voltage VOUT decreases, the first transient current flows from the second terminal to the first terminal of the first compensation network RC1, when the output voltage VOUT increases, the first transient current flows from the first terminal to the second terminal of the first compensation network RC1.

In one embodiment, the control circuit 200 may comprise the second compensation network RC2, and at least one of the first resistance regulator RA1 and a second resistance regulator RA2. The second resistance regulator RA2 is coupled to the transient detector 201 to receive the transient detecting signal SDEC and configured to regulate the second resistance of the second compensation network RC2 based on the transient detecting signal SDEC. In detail, when the transient detecting signal SDEC is in logic valid, the second resistance regulator RA2 decreases the second resistance, when the transient detecting signal SDEC is in logic invalid, the second resistance regulator RA2 increases the second resistance. "The control circuit 200 comprises at least one of the first resistance regulator RA1 and a second resistance regulator RA2" refers that the control circuit 200 may only comprise the first resistance regulator RA1 to regulate the first resistance, may only comprise the second resistance regulator RA2 to regulate the second resistance, or may comprise both the first resistance regulator RA1 and the second resistance regulator RA2 to regulate the first resistance and the second resistance respectively.

In the example of the control circuit 200 comprising the second compensation network RC2, the first feedback voltage VFB1 is a sum of the feedback voltage VFB and a second voltage across the second compensation network RC2, wherein the second voltage across the second compensation network RC2 is a product of the second resistance and a second transient current flowing through the second compensation network RC2. In one embodiment, when the output voltage VOUT decreases, the second transient current flows from the first terminal to the second terminal of the second compensation network RC2, when the output voltage VOUT increases, the second transient current flows from the second terminal to the first terminal of the second compensation network RC2. In the example of the control circuit 200 not comprising the second compensation network RC2, the first feedback voltage VFB1 is equal to the feedback voltage VFB.

Those skilled in the art can understand that, "increases the first resistance" refers that when the switch mode power supply 100 enters the transient state from the steady state, the first resistance in the transient state is larger than the first resistance in the steady state. "Decreases the second resistance" refers that the second resistance in the transient state is smaller than the second resistance in the steady state. "Decreases the first resistance" refers that when the switch mode power supply 100 enters the steady state from the transient state, the first resistance in the steady state is smaller than the first resistance in the transient state. "Increases the second resistance" refers that the second resistance in the steady state is larger than the second resistance in the transient state.

As shown in FIG. 2, the control circuit 200 further comprises a compensation capacitor CZ. The compensation capacitor CZ has a first terminal and a second terminal, wherein the first terminal of the compensation capacitor CZ is coupled to the second terminal of the first compensation network RC1, and the second terminal of the compensation capacitor CZ is coupled to the output terminal of the error amplifier EAO. In another embodiment, the first terminal of the compensation capacitor CZ is coupled to the first input terminal of the error amplifier EAO, and the second terminal of the compensation capacitor CZ is coupled to the first terminal of the first compensation network RC1.

Figure 7:
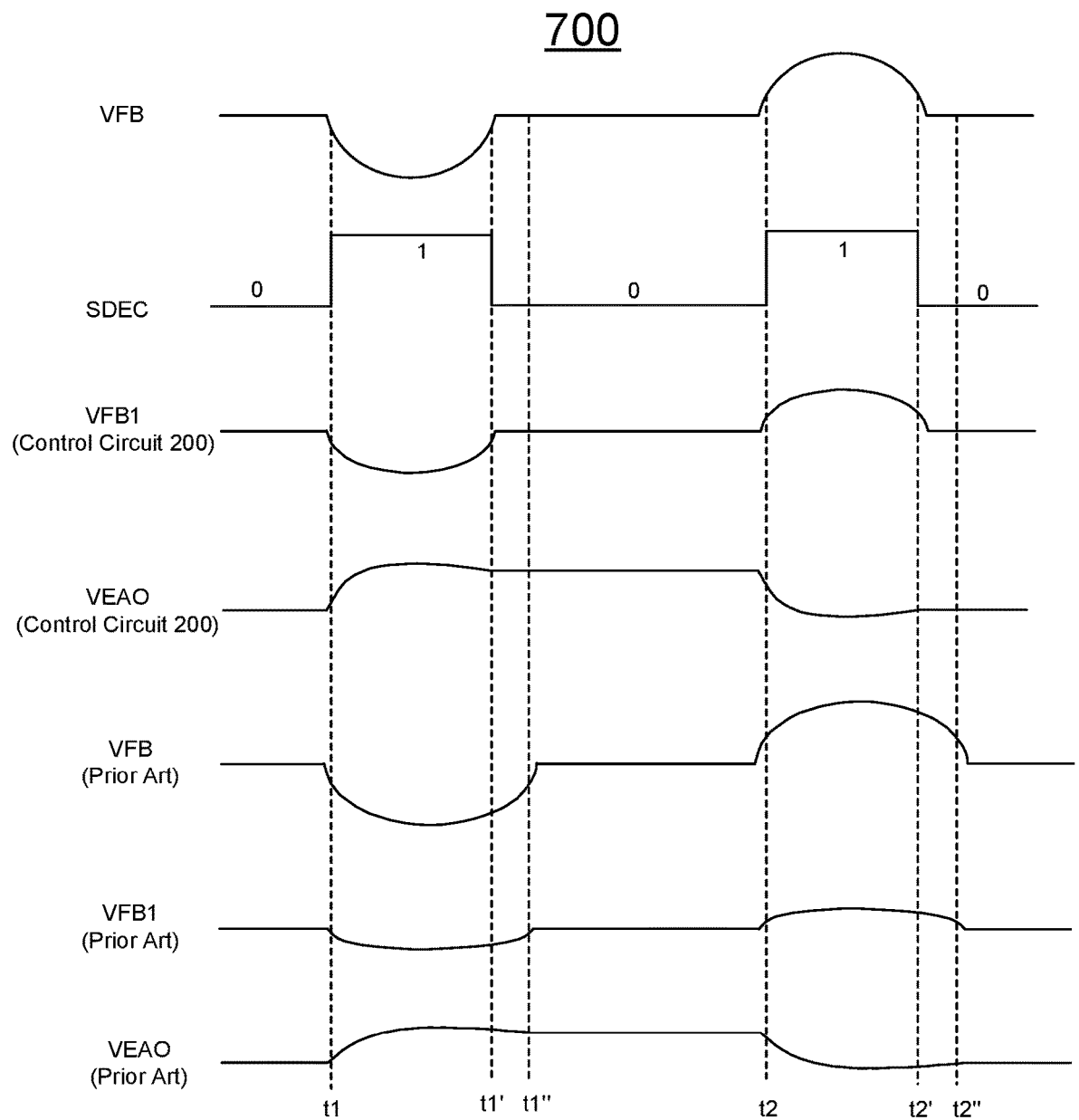
FIG. 7 is a working waveform comparison between the control circuit 200 shown in FIG. 2 and a prior art control circuit, in accordance with an embodiment of the present invention.

FIG. 7 is a working waveform comparison between the control circuit 200 shown in FIG. 2 and a prior art control circuit, in accordance with an embodiment of the present invention. In the example shown in FIG. 7, the feedback voltage VFB, the transient detecting signal SDEC, the first feedback voltage VFB1 and the error signal VEAO in control circuit 200, and the feedback voltage VFB, the first feedback voltage VFB1 and the error signal VEAO in prior art control circuit are shown in turn.

In prior art, the switch mode power supply does not regulate the first resistance and the second resistance (if any). As shown in FIG. 7, the switch mode power supply is in the transient state during a first period between time t1 and time t1" or during a second period between time t2 and time t2". For example, when the output voltage VOUT changes due to load transient, the feedback voltage VFB indicative of the output voltage VOUT changes accordingly. At this time, there is a first transient current flowing through the first compensation network RC1 and thus a first voltage across the first compensation network RC1 will be produced, which result in a first error between the error signal VEAO and the first feedback voltage VFB1. Similarly, if the control circuit comprises the second compensation network RC2, there will be a second transient current flowing through the second compensation network RC2 and a second voltage across the second compensation network will be produced, which will result in a second error between the first feedback voltage VFB1 and the feedback voltage VFB. However, the error signal VEAO in prior art can not reflect the transient state of the switch mode power supply 100 in time, and thus the transient performance of the switch mode power supply 200 is getting worse. As shown in FIG. 7, the switch mode power supply will exit the transient state until time t1" or time t2".

In the control circuit 200 of the present invention, when the switch mode power supply 100 is in the transient state during a first period between time t1 and time t1' or during a second period between time t2 and time t2', the transient detecting signal SDEC is in logic valid. Based on the transient detecting signal SDEC, the first resistance increases and/or the second resistance decreases, thus the first voltage across the first compensation network RC1 and/or the second voltage across the second compensation network RC2 will decrease. As a result, the first error between the error signal VEAO and the first feedback voltage VFB1, and the second error between the first feedback voltage VFB1 and the feedback voltage VFB will both decrease. Compared with the prior art, the error signal VEAO in control circuit 200 can reflect the transient state in time. As shown in FIG. 7, the switch mode power supply 100 can exit the transient state at earlier time t1' or time t2'. Accordingly, the transient performance of the switch mode power supply 100 is greatly improved compared with the prior art.

When the switch mode power supply 100 is in the steady state, the output voltage VOUT is a stable value. The transient detecting signal SDEC is in logic invalid, the first resistance decreases and/or the second resistance increases. As a result, the control loop bandwidth of the switch mode power supply 100 in the steady state is narrower than the control loop bandwidth in the transient state, which can improve the control loop stability of the switch mode power supply 100 in the steady state.

As discussed above, on one hand, the control circuit 200 can make the switch mode power supply 100 have a narrow control loop bandwidth in the steady state to improve the stability. On the other hand, the control circuit 200 can help improve the transient performance of the switch mode power supply 100 in the transient state.

Figure 3:
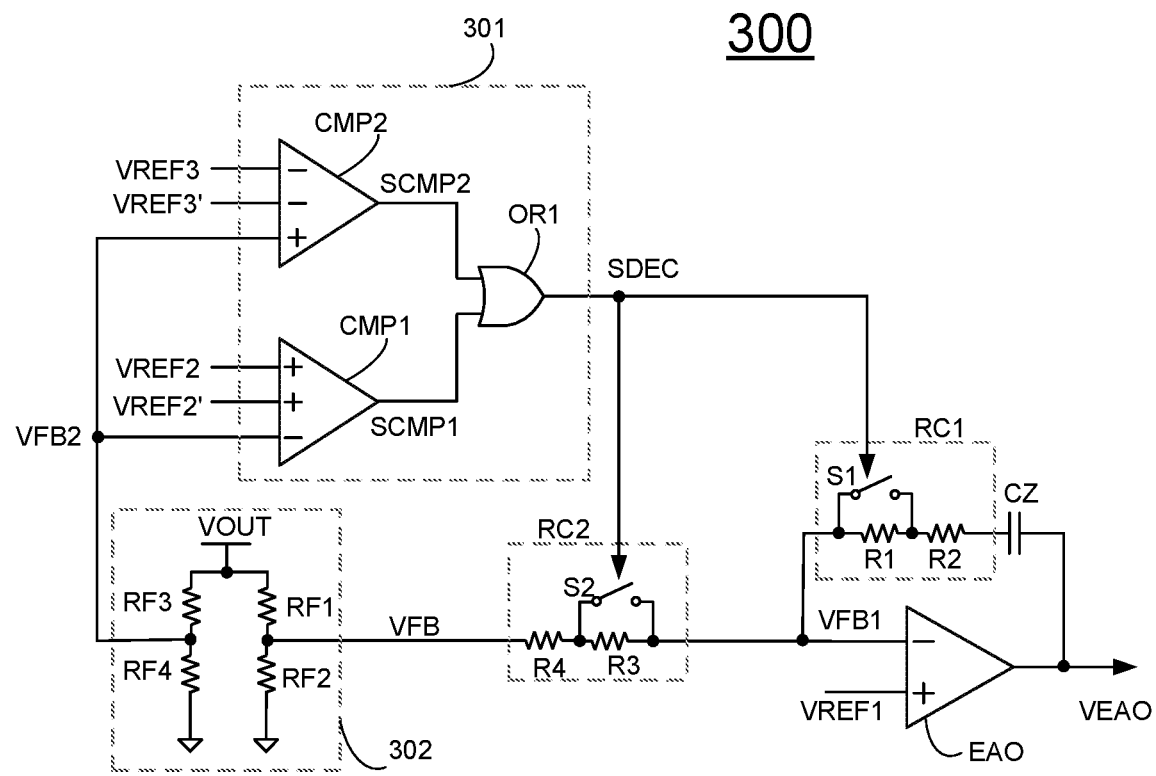
FIG. 3 is a control circuit 300 used in the switch mode power supply 100 in accordance with another embodiment of the present invention.

FIG. 3 is a control circuit 300 used in the switch mode power supply 100 in accordance with another embodiment of the present invention. Compare with the control circuit 200 in FIG. 2, the transient detector 301 in FIG. 3 is a detailed example of the transient detector 201 in FIG. 2. The transient detector 301 comprises a first comparator CMP1, a second comparator CMP2 and a first OR gate OR1. The first comparator CMP1 has a first input terminal, a second input terminal and an output terminal, wherein the first input terminal is configured to receive a second feedback voltage VFB2 indicative of the output voltage VOUT, and the second input terminal is configured to receive a second reference voltage VREF2. The first comparator CMP1 is configured to compare the second feedback voltage VFB2 with the second reference voltage VREF2 and provide a first comparing signal SCMP1 at the output terminal. In one embodiment, the first input terminal is an inverting input terminal, and the second input terminal is a non-inverting input terminal.

The second comparator CMP2 has a first input terminal, a second input terminal and an output terminal, wherein the first input terminal is configured to receive the second feedback voltage VFB2, and the second input terminal is configured to receive a third reference voltage VREF3. The second comparator CMP2 is configured to compare the second feedback voltage VFB2 with the third reference voltage VREF3 and provide a second comparing signal SCMP2 at the output terminal. In one embodiment, the first input terminal is a non-inverting input terminal, and the second input terminal is an inverting input terminal.

When the second feedback voltage VFB2 is lower than the second reference voltage VREF2, the first comparing signal SCMP1 changes from logic invalid (e.g., logic "0") into logic valid (e.g., logic "1"); when the second feedback voltage VFB2 is higher than the second reference voltage VREF2, the first comparing signal SCMP1 changes from logic valid into logic invalid. Similarly, when the second feedback voltage VFB2 is higher than the third reference voltage VREF3, the second comparing signal SCMP2 changes from logic invalid (e.g., logic "0") into logic valid (e.g., logic "1"); when the second feedback voltage VFB2 is lower than the third reference voltage VREF3, the second comparing signal SCMP2 changes from logic valid into logic invalid. In one embodiment, the third reference voltage VREF3 is higher than the second reference voltage VREF2.

In one embodiment, the first comparator CMP1 and the second comparator CMP2 are both hysteresis comparators with each having a third input terminal. The third input terminal of the first comparator CMP1 is configured to receive a second hysteresis reference voltage VREF2'. When the second feedback voltage VFB2 is lower than the second reference voltage VREF2, the first comparing signal SCMP1 changes from logic invalid into logic valid; when the second feedback voltage VFB2 is higher than the second hysteresis reference voltage VREF2', the first comparing signal SCMP1 changes from logic valid into logic invalid. In one embodiment, the third input terminal of the first comparator CMP1 is non-inverting input terminal. The third input terminal of the second comparator CMP2 is configured to receive a third hysteresis reference voltage VREF3'. When the second feedback voltage VFB2 is higher than the third reference voltage VREF3, the second comparing signal SCMP2 changes from logic invalid into logic valid; when the second feedback voltage VFB2 is lower than the third hysteresis reference voltage VREF3', the second comparing signal SCMP2 changes from logic valid into logic invalid. In one embodiment, the third input terminal of the second comparator CMP2 is inverting input terminal.

The first OR gate OR1 has a first input terminal, a second input terminal and an output terminal, wherein the first input terminal is configured to receive the first comparing signal SCMP1, and the second input terminal is configured to receive the second comparing signal SCMP2. The first OR gate OR1 is configured to provide the transient detecting signal SDEC at the output terminal based on the first comparing signal SCMP1 and the second comparing signal SCMP2.

Figure 8:
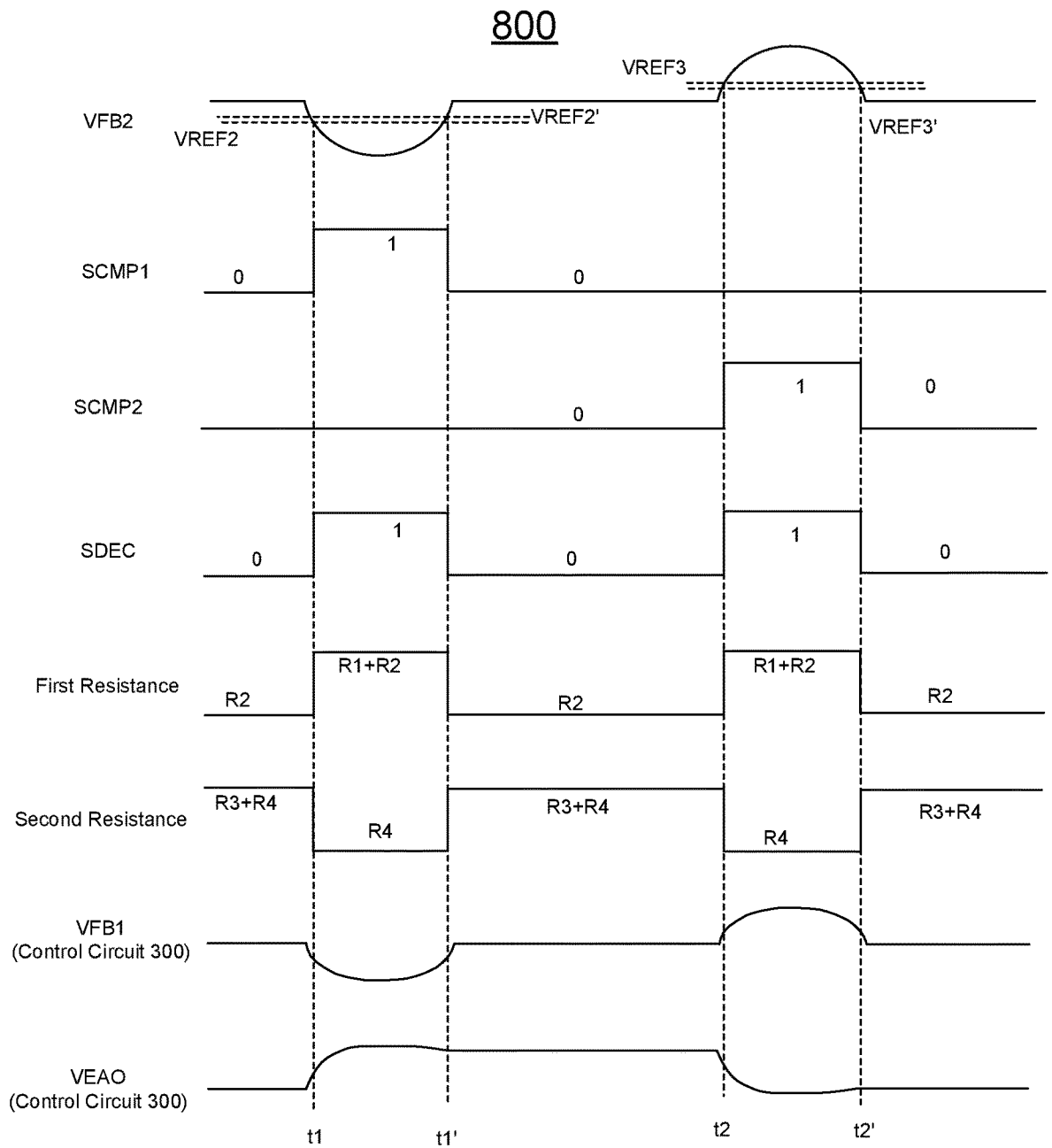
FIG. 8 are working waveforms of the control circuit 300 shown in FIG. 3 in accordance with an embodiment of the present invention.

FIG. 8 are working waveforms of the control circuit 300 shown in FIG. 3 in accordance with an embodiment of the present invention. Next, the working principle of the transient detector 301 will be described in detail. As shown in FIG. 8, when the output voltage VOUT decreases and the switch mode power supply 100 enters the transient state, the second feedback voltage VFB2 also decreases. At time t1, the second feedback voltage VFB2 is lower than the second reference voltage VREF2, the first comparing signal SCMP1 changes from logic invalid into logic valid, and the transient detecting signal SDEC changes from logic invalid into logic valid accordingly. Afterwards, the output voltage VOUT increases gradually and tends to the stable value through the regulation of the control loop, and the second feedback voltage VFB2 increases gradually, too. At time t1', the second feedback voltage VFB2 increases to the second hysteresis reference voltage VREF2', the first comparing signal SCMP1 changes form logic valid into logic invalid, and the transient detecting signal SDEC changes from logic valid into logic invalid accordingly. The switch mode power supply 100 exits the transient state and enters the steady state.

Similarly, when the output voltage VOUT increases and the switch mode power supply 100 enters the transient state, the second feedback voltage VFB2 also increases. At time t2, the second feedback voltage VFB2 is higher than the third reference voltage VREF3, the second comparing signal SCMP2 changes from logic invalid into logic valid, and the transient detecting signal SDEC changes from logic invalid into logic valid accordingly. Afterwards, the output voltage VOUT decreases gradually and tends to the stable value through the regulation of the control loop, and the second feedback voltage VFB2 decreases gradually, too. At time t2', the second feedback voltage VFB2 decreases to the third hysteresis reference voltage VREF3', the second comparing signal SCMP2 changes form logic valid into logic invalid, and the transient detecting signal SDEC changes from logic valid into logic invalid accordingly. The switch mode power supply 100 exits the transient state and enters the steady state.

FIG. 3 also illustrates a feedback circuit 302 for generating the feedback voltage VFB and the second feedback voltage VFB2. The feedback circuit 302 comprises a first feedback resistor RF1, a second feedback resistor RF2, a third feedback resistor RF3, and a fourth feedback resistor RF4. Each of the feedback resistors has a first terminal and a second terminal, wherein the first terminal of the first feedback resistor RF1 and the third feedback resistor RF3 are both coupled to the output voltage VOUT, the second terminal of the second feedback resistor RF2 and the fourth feedback resistor RF4 are both coupled to a reference ground, the first terminal of the second feedback resistor RF2 is coupled to the second terminal of the first feedback resistor RF1 to provide the feedback voltage VFB, and the first terminal of the fourth feedback resistor RF4 is coupled to the second terminal of the third feedback resistor RF3 to provide the second feedback voltage VFB2. In the example shown in GIF. 3, the feedback voltage VFB and the second feedback voltage VFB2 are different voltages. In another embodiment, the feedback voltage VFB and the second feedback voltage VFB2 are same voltage. In the example shown in FIG. 3, the first comparator CMP1 and the second comparator CMP2 are both configured to receive the second feedback voltage VFB2 as the feedback voltage. In another embodiment, the first comparator CMP1 and the second comparator CMP2 can receive different voltages as the feedback voltage. In one embodiment, the feedback circuit 302 and the control circuit 300 can be fabricated an integrated circuit (IC). In another embodiment, control circuit 300 is fabricated in an IC, and the feedback circuit 302 is coupled outside the IC.

FIG. 3 further shows detailed circuits of the first compensation network RC1, the second compensation network RC2, the first resistance regulator RA1 and the second resistance regulator RA2. As shown in FIG. 3, the first compensation network RC1 comprises a first compensation resistor R1 and a second compensation resistor R2. The first compensation resistor R1 and the second compensation resistor R2 both have a first terminal and a second terminal, wherein the first terminal of the first compensation resistor R1 is coupled to the first input terminal of the error amplifier EAO, the first terminal of the second compensation resistor R2 is coupled to the second terminal of the first compensation resistor R1, and the second terminal of the second compensation resistor R2 is coupled to the output terminal of the error amplifier EAO. The second compensation network RC2 comprises a third compensation resistor R3 and a fourth compensation resistor R4. The third compensation resistor R3 and the fourth compensation resistor R4 both have a first terminal and a second terminal, wherein the first terminal of the third compensation resistor R3 is coupled to the first input terminal of the error amplifier EAO, the first terminal of the fourth compensation resistor R4 is coupled to the second terminal of the third compensation resistor R3, and the second terminal of the fourth compensation resistor R4 is configured to receive the feedback voltage VFB. The first resistance regulator RA1 comprises a first switch S1, wherein the first switch S1 is coupled in parallel with the first compensation resistor R1, and has a control terminal configured to receive the transient detecting signal SDEC, i.e., the first switch S1 is controlled by the transient detecting signal SDEC. The second resistance regulator RA2 comprises a second switch S2, wherein the second switch S2 is coupled in parallel with the third compensation resistor R3 and has a control terminal configured to receive the transient detecting signal SDEC, i.e., the second switch S2 is controlled by the transient detecting signal SDEC. In one embodiment, the switches S1 and S2 can be any controllable semiconductor devices, such MOSFET, IGBT, or a gate circuit comprising a plurality of MOSFETs. In one embodiment, the first switch S1 is P type MOSFET, while the second switch S2 is N type MOSFET, when the transient detecting signal SDEC is in logic valid, the first switch S1 is turned OFF, and the second switch S2 is turned ON; when the transient detecting signal SDEC is in logic invalid, the first switch S1 is turned ON, and the second switch S2 is turned OFF. In another embodiment, the first switch S1 and the second switch S2 are both N type MOSFETs, the first resistance regulator RA1 further comprises an inverter, wherein the inverter is configured to receive the transient detecting signal SDEC and provide an inverted transient detecting signal to control the first switch S1.

In the example shown in FIG. 3, the first switch S1 is coupled in parallel with the first compensation resistor R1. In another embodiment, the first switch S1 is coupled in parallel with the second compensation resistor R2. Similarly, the second switch S2 can be coupled in parallel with the fourth compensation resistor R4.

Those skilled in the art should understand that, the transient detector 301, the first compensation network RC1, the second compensation network RC2, the first resistance regulator RA1, the second resistance regulator RA2 and the feedback circuit 302 do not have to work together, and any of the above circuits can operate individually to be used in the control circuit 200 as an embodiment of the present invention.

Next, the working principle of the control circuit 300 will be set forth in detail. As shown in FIG. 8, when the switch mode power supply 100 is in the steady state, the output voltage VOUT is stable, and the transient detecting signal SDEC is in logic invalid. The first switch S1 is turned ON, and the first resistance of the first compensation network RC1 is R2. The second switch S2 is turned OFF, and the second resistance of the second compensation network RC2 is R3+R4. Therefore, a narrow control loop bandwidth is provided when the switch mode power supply 100 is in the steady state, which can help improve the stability.

In the prior art, as described above, when the switch mode power supply is in the transient state, the output voltage changes. There are transient currents flowing through the first compensation network and the second compensation network, producing voltages across the first compensation network and the second compensation network. The first error between the error signal and the first feedback voltage and the second error between the first feedback voltage and the feedback voltage will be produced. Therefore, the error signal can not reflect the transient state of the switch mode power supply in time, and the transient performance becomes worse.

In the control circuit 300, the switch mode power supply 100 is in the transient state between the time t1 and t1' or between the time t2 and t2', and the transient detecting signal SDEC is in logic valid. The first switch S1 is turned OFF, and the first resistance of the first compensation network RC1 is R1+R2. The second switch S2 is turned ON, and the second resistance of the second compensation network RC2 is R4. The first resistance in the transient state becomes larger than the first resistance in the steady state and/or the second resistance in the transient state becomes smaller than the second resistance in the steady state. Compared with the prior art, the first feedback voltage VFB1 is closer to the feedback voltage VFB, and the error signal VEAO is closer to the first feedback voltage VFB1. Therefore, the control loop can respond to the transient state more quickly, and the transient performance can be improved greatly.

As abovementioned, the control circuit 300 can obtain a narrow control loop bandwidth in the steady state to improve the control loop stability of the switch mode power supply 100, and can also obtain good transient performance of the switch mode power supply 100 in the transient state.

Figure 4:
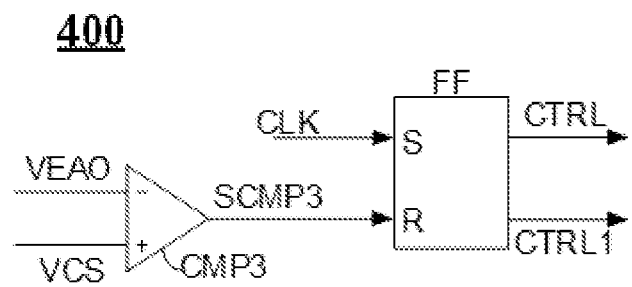
FIG. 4 is a downstream control circuit 400 used together with the control circuit 200 or 300, in accordance with an embodiment of the present invention.

FIG. 4 is a downstream control circuit 400 used together with the control circuit 200 or 300, in accordance with an embodiment of the present invention. The downstream control circuit 400 comprises a third comparator CMP3 and a RS flip-flop FF. The third comparator CMP3 has a first input terminal, a second input terminal, and an output terminal, wherein the first input terminal is configured to receive the error signal VEAO, and the second input terminal is configured to receive a current sensing signal VCS. The third comparator CMP3 is configured to provide a third comparing signal SCMP3 at the output terminal based on the error signal VEAO and the current sensing signal VCS. In one embodiment, the current sensing signal VCS can be obtained by sensing an inductor current iL flowing through the inductor LOUT, a high side switch current flowing through the high side switch M1 or a low side switch current flowing through the low side switch M2. Actually, the inductor current iL also represents the high side switch current or the low side switch current.

The RS flip-flop has a set terminal S and a reset terminal R, wherein the set terminal S is configured to receive a clock signal CLK, and the reset terminal R is coupled to the output terminal of the third comparator CMP3 to receive the third comparing signal SCMP3. The RS flip-flop is configured to generate control signals CTRL and CTRL1 to control respectively the high side switch S1 and the low side switch S2 based on the clock signal CLK and the third comparing signal SCMP3.

Those skilled in the art should understand that, the control circuit 400 takes the peak current control as an example for illustration, other suitable control methods are also applicable here.

Figure 5:
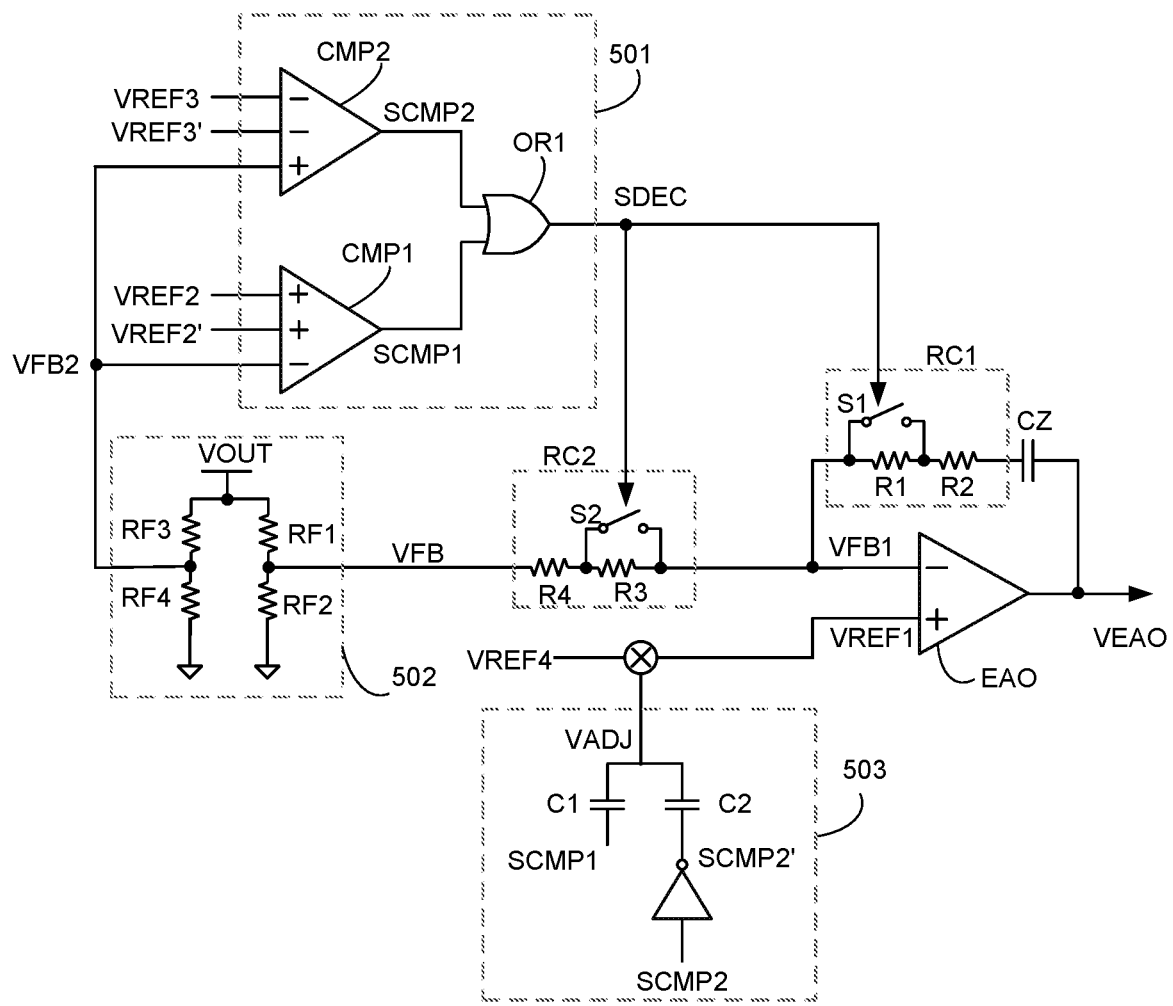
FIG. 5 is a control circuit 500 used in the switch mode power supply 100 in accordance with an embodiment of the present invention.

FIG. 5 is a control circuit 500 used in the switch mode power supply 100 in accordance with an embodiment of the present invention. Compared with the control circuit 300, the control circuit 500 further comprises an adjusting voltage generator 503. The adjusting voltage generator 503 is configured to provide an adjusting voltage VADJ to the second input terminal of the error amplifier EAO when the switch mode power supply 100 enters the transient state. A sum of the adjusting voltage VADJ and a fourth reference voltage VREF4 is provided to the second input terminal of the error amplifier EAO as the first reference voltage VREF1. In detail, when the output voltage VOUT decreases and the switch mode power supply 100 enters the transient state, the adjusting voltage VADJ is a positive voltage; when the output voltage VOUT increases and the switch mode power supply 100 enters the transient state, the adjusting voltage VADJ is a negative voltage.

In the example shown in FIG. 5, the adjusting voltage generator 503 comprises a first capacitor C1. The first capacitor C1 has a first terminal and a second terminal, wherein the first terminal is coupled to the output terminal of the first comparator CMP1 to receive the first comparing signal SCMP1, and the second terminal is coupled to the second input terminal of the error amplifier EAO to provide the adjusting voltage VADJ. In another embodiment, the adjusting voltage generator 503 further comprises a second capacitor C2 and an inverter INV. The inverter INV has an input terminal and an output terminal, wherein the input terminal is coupled to the second comparator CMP2 to receive the second comparing signal SCMP2. The inverter INV is configured to invert the second comparing signal SCMP2 and provide an inverted comparing signal SCMP2' at the output terminal. The second capacitor C2 has a first terminal and a second terminal, wherein the first terminal is coupled to the output terminal of the inverter INV to receive the inverted comparing signal SCMP2', and the second terminal of the second capacitor C2 is coupled to the second input terminal of the error amplifier EAO to provide the adjusting voltage VADJ.

Figure 9:
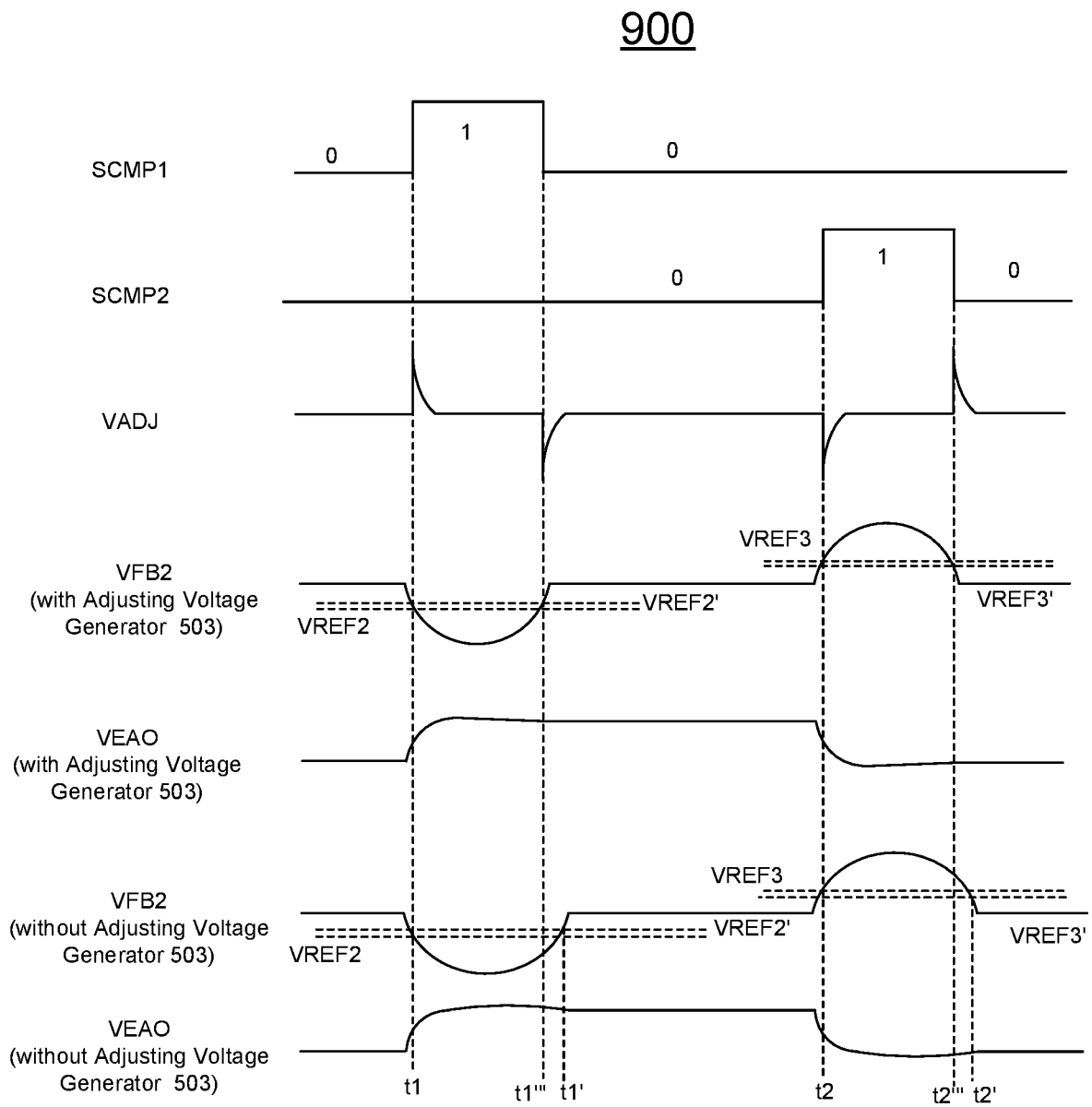
FIG. 9 are working waveforms of the control circuit 500 shown in FIG. 5 in accordance with an embodiment of the present invention.

FIG. 9 are working waveforms of the control circuit 500 shown in FIG. 5 in accordance with an embodiment of the present invention. Next, the working principle of the adjusting voltage generator 503 will be set forth in detail.

On one hand, when the output voltage VOUT decreases and the switch mode power supply 100 enters the transient state, the second feedback voltage VFB2 decreases, too. At time t1, the second feedback voltage VFB2 is lower than the second reference voltage VREF2, the first comparing signal SCMP1 changes from the logic invalid into logic valid. The first capacitor C1 generates a positive spike as the adjusting voltage VADJ. The adjusting voltage VADJ and the fourth reference voltage VREF4 are added together as the first reference voltage VREF1. Therefore, the first reference voltage VREF1 at the second input terminal of the error amplifier EAO will increase instantaneously. As described above, there will be a first error between the error signal VEAO and the first feedback voltage VFB1, and a second error between the first feedback voltage VFB1 and the feedback voltage VFB, when the output voltage VOUT decreases and the switch mode power supply 100 enters the transient state. The increased first reference voltage VREF1 can increase the input differential signal of the error amplifier EAO in the transient state to improve the transient response speed of the control loop. As shown in FIG. 9, the switch mode power supply exits the transient state at time t1''', which is further earlier than the time t1'.

On the other hand, when the output voltage VOUT increases and the switch mode power supply enters the transient state, the second feedback voltage VFB2 increases, too. At time t2, the second feedback voltage VFB2 is higher than the third reference voltage VREF3, and the second comparing signal SCMP2 changes from logic invalid into logic valid. The second capacitor C2 generates a negative spike as the adjusting voltage VADJ. The adjusting voltage VADJ and the fourth reference voltage VREF4 are added together as the first reference voltage VREF1. Therefore, the first reference voltage VREF1 decreases instantaneously when the output voltage VOUT increases and the switch mode power supply enters the transient state. The decreased first reference voltage VREF1 can increase the input differential signal of the error amplifier EAO in the transient state to improve the transient response speed of the control loop. The switch mode power supply exits the transient state at time t2''', which is further earlier than the time t2'. Compared with the control circuit without the adjusting voltage generator 503, the transient performance is further improved.

Figure 6:
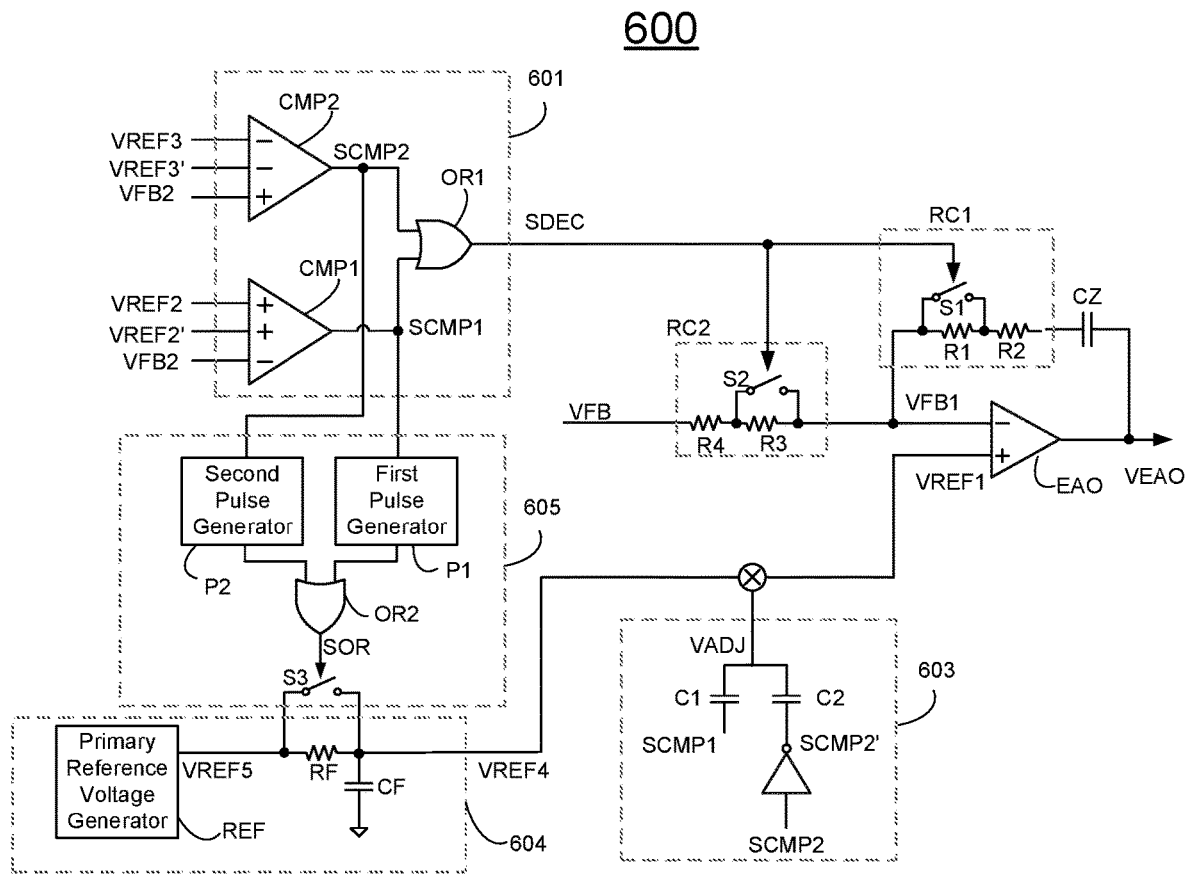
FIG. 6 is a control circuit 600 used in the switch mode power supply 100 in accordance with another embodiment of the present invention.

FIG. 6 is a control circuit 600 used in the switch mode power supply 100 in accordance with another embodiment of the present invention. Compared with the control circuit 500, the control circuit 600 further comprises a reference voltage generator 604 and an elimination circuit 605. As shown in FIG. 6, the reference voltage generator 604 comprises a primary reference voltage generator REF with a low output impedance, a filtering resistor RF and a filtering capacitor CF. The primary reference voltage generator REF is configured to generate a fifth reference voltage VREF5. The filtering resistor RF has a first terminal and a second terminal, wherein the first terminal is coupled to the primary reference voltage generator REF to receive the fifth reference voltage VREF5. The filtering capacitor CF has a first terminal and a second terminal, therein the first terminal of the filtering capacitor CF is coupled to the second terminal of the filtering resistor RF, and configured to provide the fourth reference voltage VREF4 to the second input terminal of the error amplifier EAO, and the second terminal of the filtering capacitor CF is coupled to a reference ground.

The elimination circuit 605 comprises a first pulse generator P1 and a third switch S3. The first pulse generator P1 is coupled to the output terminal of the first comparator CMP1 to receive the first comparing signal SCMP1, and configured to generate a first pulse signal SP1 at a falling edge of the first comparing signal SCMP1. The third switch S3 is coupled in parallel with the filtering resistor RF and has a control terminal coupled to the first pulse generator P1 to receive the first pulse signal SP1, i.e., the third switch S3 is controlled by the first pulse signal SP1.

Figure 10:
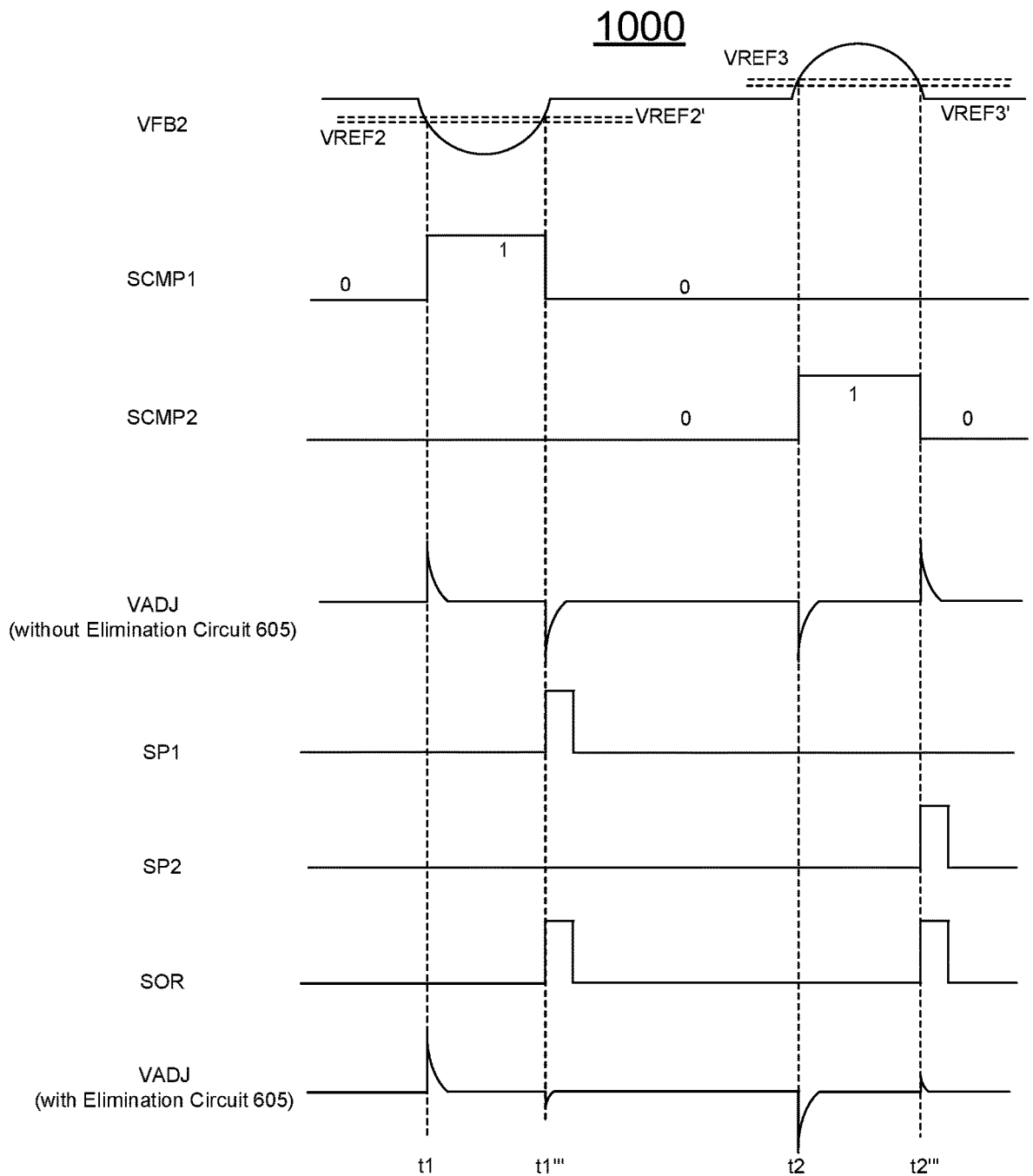
FIG. 10 are working waveforms of the control circuit 600 shown in FIG. 6 in accordance with an embodiment of the present invention.

FIG. 10 are working waveforms of the control circuit 600 shown in FIG. 6 in accordance with an embodiment of the present invention. As shown in FIG. 10, when the output voltage VOUT decreases, the switch mode power supply 100 enters the transient state. At time t1, a rising edge of the first comparing signal SCMP1 comes, the first capacitor C1 generates a positive spike as the adjusting voltage VADJ and the adjusting voltage VADJ will be provided to the second input terminal of the error amplifier EAO. At time t1''', a falling edge of the first comparing signal SCMP1 comes, the first capacitor C1 generates a negative spike and the spike will be also provided to the second input terminal of the error amplifier EAO, which will result in a reverse disturbance in the error amplifier EAO when the switch mode power supply 100 tends to be stable. In the control circuit 600, when the falling edge of the first comparing signal SCMP1 comes at time t1''', the first pulse signal SP1 is generated and makes the third switch S3 turned ON to short the filtering resistor RF. Thus the negative spike can be absorbed by the primary reference voltage generator REF due to the low output impedance, and will not be added to the second input terminal of the error amplifier EAO. Therefore, the error amplifier EAO will not have the reverse disturbance when switch mode power supply 100 tends to be stable.

In one embodiment, the control circuit 600 further comprises a second pulse generator P2 and a second OR gate OR2. The second pulse generator P2 is coupled to the output terminal of the second comparator CMP2 to receive the second comparing signal SCMP2, and configured to generate a second pulse signal SP2 at a falling edge of the second comparing signal SCMP2. The second OR gate OR2 has a first input terminal, a second input terminal and an output terminal, wherein the first input terminal is configured to receive the first pulse signal SP1 and the second input terminal is configured to receive the second pulse signal SP2. The second OR gate OR2 is configured to provide an OR signal SOR at the output terminal based on the first pulse signal SP1 and the second pulse signal SP2. The control terminal of the third switch S3 is coupled to the second OR gate OR2 to receive the OR signal SOR, i.e., the third switch S3 is controlled by the OR signal SOR.

As shown in FIG. 10, when the output voltage VOUT increases, the switch mode power supply 100 enters the transient state. At time t2, a rising edge of the second comparing signal SCMP2 comes, the second capacitor C2 generates a negative spike as the adjusting voltage VADJ and the adjusting voltage VADJ will be provided to the second input terminal of the error amplifier EAO. At time t2''', a falling edge of the second comparing signal SCMP2 comes, the second capacitor C2 generates a positive spike and the positive spike will be also provided to the second input terminal of the error amplifier EAO, which will result in a reverse disturbance in the error amplifier EAO when the switch mode power supply 100 tends to be stable. In the control circuit 600, when the falling edge of the second comparing signal SCMP2 comes at time t2''', the second pulse signal SP2 is generated and makes the third switch S3 turned ON to short the filtering resistor RF. Thus the positive spike can be absorbed by the primary reference voltage generator REF due to the low output impedance, and will not be added to the second input terminal of the error amplifier EAO. Therefore, the error amplifier EAO will not have the reverse disturbance when switch mode power supply 100 tends to be stable.

Figure 11:
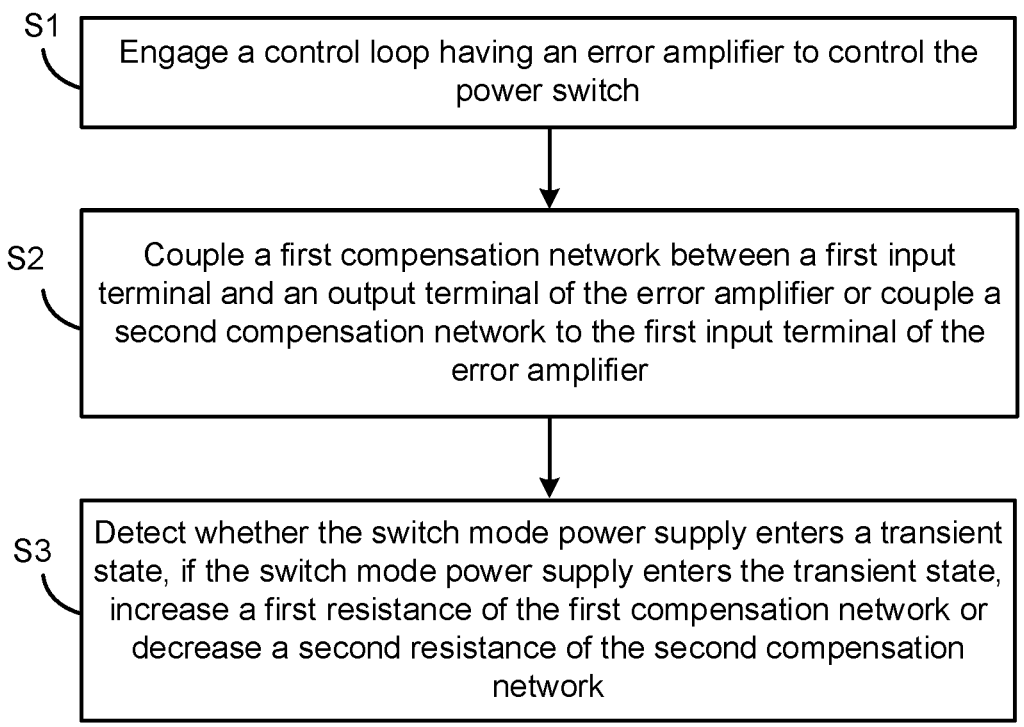
FIG. 11 is flow chart of a control method 1100 used in a switch mode power supply in accordance with an embodiment of the present invention.

FIG. 11 is flow chart of a control method 1100 used in a switch mode power supply in accordance with an embodiment of the present invention. The switch mode power supply comprises a power switch and is configured to convert an input voltage into an output voltage. The control method 1100 includes steps S1-S3.

At step S1, a control loop having an error amplifier is engaged to control the power switch, wherein the error amplifier has a first input terminal, a second input terminal, and an output terminal.

At step S2, a first compensation network is coupled between the first input terminal and the output terminal of the error amplifier, or a second compensation network is coupled to the first input terminal of the error amplifier.

At step S3, detecting whether the switch mode power supply enters a transient state. If the switch mode power supply enters the transient state, increasing a first resistance of the first compensation network or decreasing a second resistance of the second compensation network.

In one embodiment, at step S2, the first compensation network is coupled between the first input terminal and the output terminal of the error amplifier. Then at step S3, if the switch mode power supply enters the transient state, increasing the first resistance of the first compensation network. In another embodiment, at step S2, the first compensation network is coupled between the first input terminal and the output terminal of the error amplifier, and the second compensation network is coupled to the first input terminal of the error amplifier. Then at step S3, if the switch mode power supply enters the transient state, increasing the first resistance of the first compensation network and/or decreasing the second resistance of the second compensation network.

In one embodiment, the step of detecting whether the switch mode power supply enters a transient state includes: comparing a second feedback voltage indicative of the output voltage with a second reference voltage and a third reference voltage, if the second feedback voltage is lower than the second reference voltage or higher than the third reference voltage, the switch mode power supply enters the transient state.

In another embodiment, the control method 1100 further comprises: when the output voltage decreases and the switch mode power supply enters the transient state, a positive voltage is provided to the second input terminal of the error amplifier; when the output voltage increases and the switch mode power supply enters the transient state, a negative voltage is provided to the second input terminal of the error amplifier.

In another embodiment, the control method 1100 further comprises detecting whether the switch mode power supply exits the transient state. If the switch mode power supply exits the transient state, decreasing the first resistance of the first compensation network or increasing the second resistance of the second compensation network.

Although many detailed circuits are shown in the embodiments above, it is apparent to persons of ordinary skills in the art that, these detailed circuits are only used for illustration purpose only, and are not intended to limit the present invention. Other suitable circuit structure with same or similar function could also be utilized. Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit used in a switch mode power supply, wherein the switch mode power supply has a power switch and an inductor, and converts an input voltage into an output voltage, the control circuit comprising:
   a transient detector configured to detect whether the switch mode power supply is in a transient state, and generate a transient detecting signal based on the detection result;
   an error amplifier having a first input terminal, a second input terminal and an output terminal, wherein the first input terminal is configured to receive a first feedback voltage indicative of the output voltage and the second input terminal is configured to receive a first reference voltage, the error amplifier is configured to provide an error signal at the output terminal based on the first feedback voltage and the first reference voltage;
   a first compensation network having a first resistance, the first compensation network has a first terminal and a second terminal, wherein the first terminal is coupled to the first input terminal of the error amplifier and the second terminal is coupled to the output terminal of the error amplifier;
   a first resistance regulator configured to receive the transient detecting signal and regulate the first resistance based on the transient detecting signal; and
   an adjusting voltage generator, wherein when the output voltage decreases and the switch mode power supply enters the transient state, the adjusting voltage generator is configured to provide an adjusting voltage with positive polarity to the second input terminal of the error amplifier, and wherein when the output voltage increases and the switch mode power supply enters the transient state, the adjusting voltage generator is configured to provide an adjusting voltage with negative polarity to the second input terminal of the error amplifier.

2. The control circuit of claim 1, wherein the transient detector comprises:
   a first comparator having a first input terminal, a second input terminal and an output terminal, wherein the first input terminal is configured to receive a second feedback voltage indicative of the output voltage and the second input terminal is configured to receive a second reference voltage, the first comparator is configured to provide a first comparing signal at the output terminal based on the second feedback voltage and the second reference voltage;
   a second comparator having a first input terminal, a second input terminal and an output terminal, wherein the first input terminal is configured to receive the second feedback voltage and the second input terminal is configured to receive a third reference voltage, the second comparator is configured to provide a second comparing signal at the output terminal based on the second feedback voltage and the third reference voltage; and
   a first OR gate having a first input terminal, a second input terminal and an output terminal, wherein the first input terminal is coupled to the first comparator to receive the first comparing signal, and the second input terminal is coupled to the second comparator to receive the second comparing signal, the first OR gate is configured to provide the transient detecting signal at the output terminal based on the first comparing signal and the second comparing signal.

3. The control circuit of claim 2, wherein the adjusting voltage generator comprises:
   a first capacitor having a first terminal and a second terminal, wherein the first terminal is coupled to the first comparator to receive the first comparing signal and the second terminal is coupled to the second input terminal of the error amplifier;
   an inverter having an input terminal and an output terminal, wherein the input terminal is coupled to the second comparator to receive the second comparing signal and the output terminal is configured to provide an inverted comparing signal; and a second capacitor having a first terminal and a second terminal, wherein the first terminal is coupled to the output terminal of the inverter to receive the inverted comparing signal and the second terminal is coupled to the second input terminal of the error amplifier, wherein the second terminal of the first capacitor and the second terminal of the second capacitor are coupled together to provide the adjusting voltage.

4. The control circuit of claim 3, further comprising:
a reference voltage generator, comprising:
   a filtering capacitor having a first terminal and a second terminal, wherein the first terminal is coupled to the second input terminal of the error amplifier to provide a fourth reference voltage, and the second terminal is coupled to a reference ground;
   a primary reference voltage generator configured to provide a fifth reference voltage; and
   a filtering resistor having a first terminal and a second terminal, wherein the first terminal is coupled to the primary reference voltage generator to receive the fifth reference voltage, and the second terminal is coupled to the first terminal of the filtering capacitor; and
an elimination circuit, comprising:
   a first pulse generator coupled the output terminal of the first comparator to receive the first comparing signal and configured to generate a first pulse signal at a falling edge of the first comparing signal; and
   a third switch coupled in parallel with the filtering resistor and configured to be controlled by the first pulse signal.

5. The control circuit of claim 4, wherein the elimination circuit further comprises:
   a second pulse generator coupled the output terminal of the second comparator to receive the second comparing signal and configured to generate a second pulse signal at a falling edge of the second comparing signal;
   a second OR gate having a first input terminal, a second input terminal and an output terminal, wherein the first input terminal is configured to receive the first pulse signal, and the second input terminal is configured to receive the second pulse signal, the second OR gate is configured to provide a OR signal at the output terminal based on the first pulse signal and the second pulse signal; and
   wherein the third switch is configured to be controlled by the OR signal.

6. The control circuit of claim 1, further comprising:
   a third comparator having a first input terminal, a second input terminal and an output terminal, wherein the first input terminal is configured to receive the error signal, and the second input terminal is configured to receive a current sensing signal indicative of a current flowing through the inductor, the third comparator is configured to provide a third comparing signal at the output terminal based on the error signal and the current sensing signal; and
   a RS flip-flop having a set terminal and a reset terminal, wherein the set terminal is configured to receive a clock signal, and the reset terminal is coupled to the output terminal of the third comparator to receive the third comparing signal, the RS flip-flop is configured to control the power switch based on the clock signal and the third comparing signal.

7. The control circuit of claim 1, wherein:
the first compensation network comprises a first compensation resistor and a second compensation resistor both having a first terminal and a second terminal, wherein the first terminal of the first compensation resistor is coupled to the first input terminal of the error amplifier, the first terminal of the second compensation resistor is coupled the second terminal of the first compensation resistor, and the second terminal of the second compensation resistor is coupled to the output terminal of the error amplifier; and
the first resistance regulator comprises a first switch, wherein the first switch is coupled in parallel with the first compensation resistor or the second compensation resistor, and configured to be controlled by the transient detecting signal.

8. The control circuit of claim 1, further comprising:
a second compensation network having a second resistance, the second compensation network has a first terminal and a second terminal, wherein the first terminal is coupled to the first input terminal of the error amplifier and the second terminal is configured to receive a feedback voltage indicative of the output voltage; and
a second resistance regulator configured to receive the transient detecting signal and regulate the second resistance based on the transient detecting signal.

9. The control circuit of claim 8, wherein:
the second compensation network comprises a third compensation resistor and a fourth compensation resistor both having a first terminal and a second terminal, wherein the first terminal of the third compensation resistor is coupled to the first input terminal of the error amplifier, the first terminal of the fourth compensation resistor is coupled the second terminal of the third compensation resistor, and the second terminal of the fourth compensation resistor is configured to receive the feedback voltage; and
the second resistance regulator comprises a second switch, wherein the second switch is coupled in parallel with the third compensation resistor or the fourth compensation resistor, and configured to be controlled by the transient detecting signal.

10. The control circuit of claim 8, wherein when the transient detecting signal is in a logic valid state, the first resistance of the first compensation network is regulated to increase, and the second resistance of the second compensation network is regulated to decrease.

11. A switch mode power supply configured to convert an input voltage into an output voltage, the switch mode power supply comprising:
   a power switch;
   an inductor;
   a transient detector configured to detect whether the switch mode power supply is in a transient state, and generate a transient detecting signal based on the detection result;
   an error amplifier having a first input terminal, a second input terminal and an output terminal, wherein the first input terminal is configured to receive a first feedback voltage indicative of the output voltage and the second input terminal is configured to receive a first reference voltage, the error amplifier is configured to provide an error signal at the output terminal based on the first feedback voltage and the first reference voltage;
   a first compensation network having a first resistance, the first compensation network has a first terminal and a second terminal, wherein the first terminal is coupled to the first input terminal of the error amplifier and the second terminal is coupled to the output terminal of the error amplifier;
a first resistance regulator configured to receive the transient detecting signal and regulate the first resistance based on the transient detecting signal; and
an adjusting voltage generator, wherein when the output voltage decreases and the switch mode power supply enters the transient state, the adjusting voltage generator is configured to provide an adjusting voltage with positive polarity to the second input terminal of the error amplifier, and wherein when the output voltage increases and the switch mode power supply enters the transient state, the adjusting voltage generator is configured to provide an adjusting voltage with negative polarity to the second input terminal of the error amplifier.

12. The switch mode power supply of claim 11, wherein the transient detector comprises:
a first comparator having a first input terminal, a second input terminal and an output terminal, wherein the first input terminal is configured to receive a second feedback voltage indicative of the output voltage and the second input terminal is configured to receive a second reference voltage, the first comparator is configured to provide a first comparing signal at the output terminal based on the second feedback voltage and the second reference voltage;
a second comparator having a first input terminal, a second input terminal and an output terminal, wherein the first input terminal is configured to receive the second feedback voltage and the second input terminal is configured to receive a third reference voltage, the second comparator is configured to provide a second comparing signal at the output terminal based on the second feedback voltage and the third reference voltage; and
a first OR gate having a first input terminal, a second input terminal and an output terminal, wherein the first input terminal is coupled to the first comparator to receive the first comparing signal, and the second input terminal is coupled to the second comparator to receive the second comparing signal, the first OR gate is configured to provide the transient detecting signal at the output terminal based on the first comparing signal and the second comparing signal.

13. The switch mode power supply of claim 11, further comprising:
a second compensation network having a second resistance, the second compensation network has a first terminal and a second terminal, wherein the first terminal is coupled to the first input terminal of the error amplifier and the second terminal is configured to receive a feedback voltage indicative of the output voltage; and
a second resistance regulator configured to receive the transient detecting signal and regulate the second resistance based on the transient detecting signal.

14. The switch mode power supply of claim 13, wherein when the transient detecting signal is in a logic valid state, the first resistance of the first compensation network is regulated to increase, and the second resistance of the second compensation network is regulated to decrease.

15. A control method used in a switch mode power supply, wherein the switch mode power supply has a power switch and converts an input voltage into an output voltage by controlling the power switch, the control method comprising:
engaging a control loop having an error amplifier to control the power switch, wherein the error amplifier has a first input terminal, a second input terminal and an output terminal;
coupling a first compensation network between the first input terminal and the output terminal of the error amplifier, or coupling a second compensation network to the first input terminal of the error amplifier; and
detecting whether the switch mode power supply enters a transient state, if the switch mode power supply enters the transient state, increasing a first resistance of the first compensation network or decreasing a second resistance of the second compensation network; wherein
when the output voltage decreases and the switch mode power supply enters the transient state, a positive voltage is provided to the second input terminal of the error amplifier; and wherein
when the output voltage increases and the switch mode power supply enters the transient state, a negative voltage is provided to the second input terminal of the error amplifier.

16. The control method of the claim 15, wherein the step of detecting whether the switch mode power supply enters the transient state comprises:
comparing a second feedback voltage indicative of the output voltage with a second reference voltage and a third reference voltage, if the second feedback voltage is lower than the second reference voltage or higher than the third reference voltage, the switch mode power supply enters the transient state.

17. The control method of the claim 15, further comprising:
detecting whether the switch mode power supply exits the transient state, if the switch mode power supply exits the transient state, decreasing the first resistance of the first compensation network or increasing the second resistance of the second compensation network.

* * * * *